United States Patent [19]

Breitzman

[11] 4,021,174
[45] May 3, 1977

[54] APPARATUS FOR FORMING COMPOSITION BOARD BY EXTRUSION

[75] Inventor: James J. Breitzman, Dallas, Tex.

[73] Assignee: ITP Corporation, Dallas, Tex.

[22] Filed: Sept. 22, 1975

[21] Appl. No.: 615,431

[52] U.S. Cl. .............................. 425/135; 425/145; 425/200; 425/209; 259/6; 259/105

[51] Int. Cl.$^2$ .......................................... B29J 5/00

[58] Field of Search .......... 425/200, 201, 209, 135, 425/145; 259/6, 105; 264/122, 40

[56] References Cited

UNITED STATES PATENTS 3,229,009  1/1966  Knowles ............................ 425/200

Primary Examiner—Robert L. Spicer, Jr.
Attorney, Agent, or Firm—Giles C. Clegg, Jr.

[57] ABSTRACT

Method and apparatus for making composition board having a planar surface and legs by an extrusion process from its constituent materials wherein there is provided an improved agitation mechanism for insuring the uniform dispersion of constituent material in the legs of the mold. The improved mechanism includes a plurality of pairs of agitation fingers, each pair adapted to oscillate in opposite directions about the same axis. Separate rack and pinion arrangements control the oscillation of respective fingers of the pairs. A pair of hydraulic cylinders controls the movement of the racks, the pinions being coupled to the fingers. The hydraulic cylinders are arranged in a control circuit, the operation of which is timed by a flywheel on the extrusion apparatus. The improved mechanism includes means for adjusting the timing of the finger oscillation relative to movement of a piston driven by the flywheel for optimum operation. Density of the legs of the board is controlled by controlling the timing.

5 Claims, 7 Drawing Figures

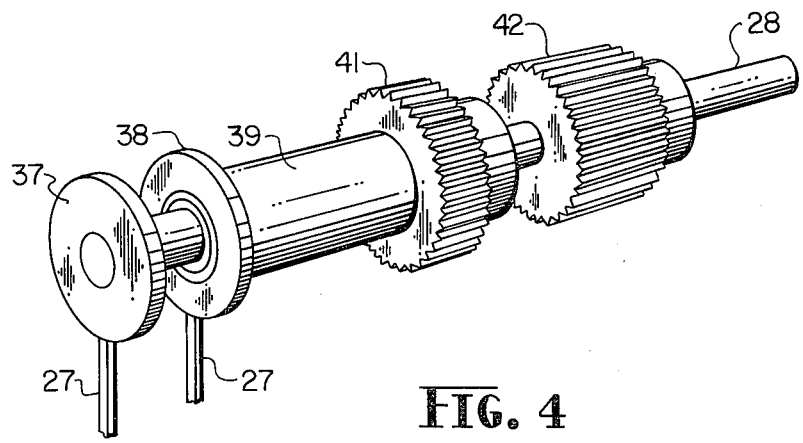
FIG. 4
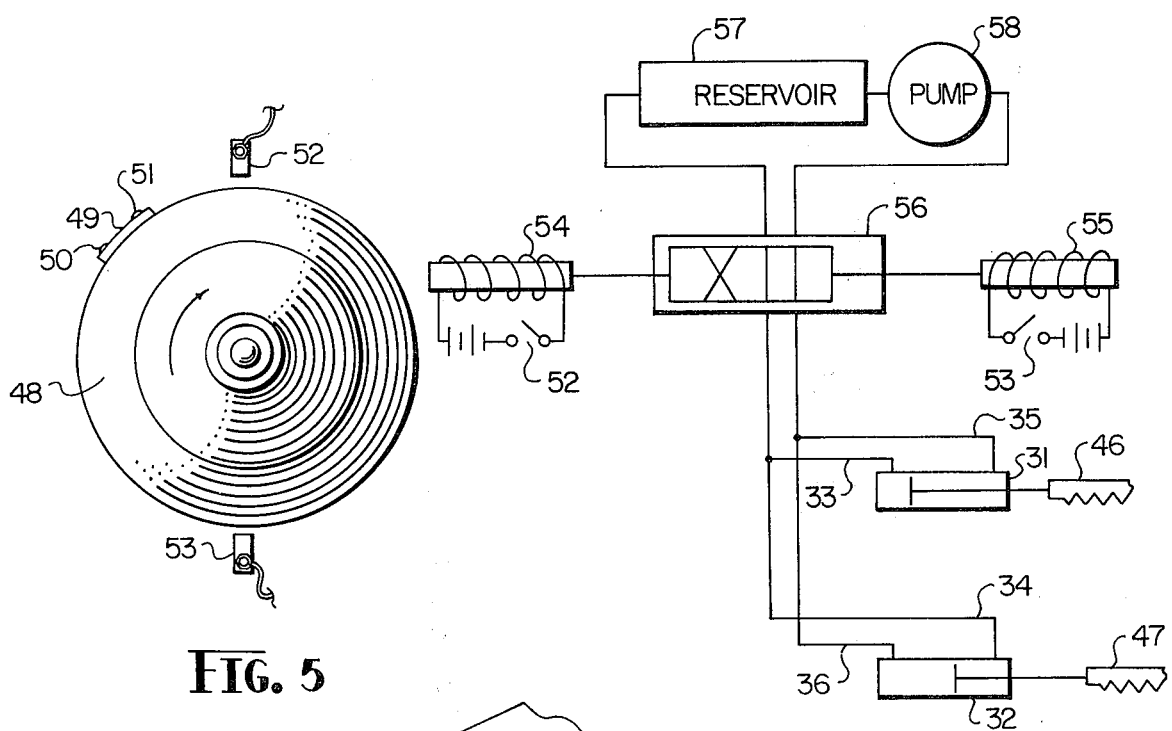
FIG. 5
FIG. 6
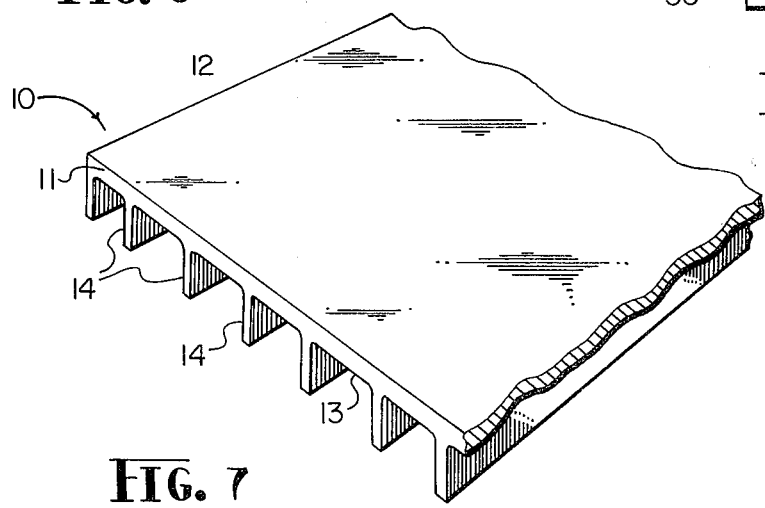
FIG. 7

APPARATUS FOR FORMING COMPOSITION BOARD BY EXTRUSION

BACKGROUND OF THE INVENTION

This invention relates to the manufacture of composition board by extrusion and, more particularly, to an improved agitation mechanism for insuring the uniform dispersion of the composition material throughout the extrusion mold.

The manufacture of composition board by an extrusion process is well known in the art. Typical composition board is formed from a mixture of fine ligno-cellulose particles combined with a suitable resin binder. The mixture is metered from a large hopper into a feed chamber where a reciprocating piston forces the mixture into a heated mold. The mold is open at an outlet end opposite to the inlet end where the piston is situated so that successive compressive forces applied to the mixture by the reciprocating piston results in the continuous molding of composition board. Typical apparatus for manufacturing composition board in accordance with afore described process is disclosed, for example, in U.S. Pat. No. 3,229,009, the disclosure of which patent is hereby incorporated by reference herein.

A typical composition board which may be manufactured by a machine of the type described in the aforementioned patent is a continuous 40 inches wide sheet with 13/16 inch ribs every 2 inches across the width of the board on one side thereof. To maintain uniform density of the composition board in both the flat panel portions and the ribs, it is necessary to distribute evenly the constituent materials prior to it being forced into the mold by the piston. To accomplish this, a plurality of oscillating fingers are provided in the feed chamber above the reciprocating piston. These fingers are spaced along the width of the mold with a pair of fingers above the position of each of the ribs. These fingers are adapted to oscillate in opposite directions. It has been found that the oscillation of the fingers must be timed relative to the stroke of the reciporcating piston in order to maintain uniform board density. In particular, the fingers oscillate through a selected angle, suitably approximately 60° of rotation in opposite directions, "dead center" of the oscillation being in a vertical orientation with extremes of 30° angular displacement to either side. It has been found that at approximately the time the reciprocating piston is fully retracted and ready to move forward to force the mixture into the mold, the fingers should be at their extremities of oscillation at opposite ends from the vertical orientation. The fingers should move to the opposite point of maximum angular displacement before the piston enters the mold and should stay in that position for the remainder of the forward piston movement. The reverse direction of oscillation of the fingers occurs during the reverse travel of the piston. Thus, the agitation mechanism must be precisely coordinated with the movement of the reciprocating piston. Prior attempts to do this reliably have not been entirely successful. For example, in the aforedescribed patent the movement of the agitating fingers is controlled by a complex eccentric cam arrangement. However, such cams wear out relatively quickly. It has also been found that a mechanical linkage between the piston and the agitating fingers is unreliable in that it is extremely difficult to properly adjust the timing between the movement of the piston and the agitating fingers.

Another important aspect of the invention is the discovery that by varying the time at which oscillation of the fingers occurs relative to the movement of the piston the density of the legs can be controlled.

SUMMARY OF THE INVENTION

In accordance with the principles of this invention, an imporved agitation mechanism is provided in the feed chamber of an extrusion machine for the manufacture of composition board. Means are provided for sensing the position of the reciprocating piston. This means is, in accordance with one embodiment of the invention, a "target" mounted on a flywheel of the extrusion machine. When the target passes a first sensor, this indicates that the piston is in the fully retracted position. When the target passes a second sensor, this indicates that the piston is in the fully extended position. These sensors are utilized to generate signals which control the movement of the fingers. The fingers are moved by racks which engage pinion gears attached to the fingers. These racks are connected to hydraulic cylinders which are selectively pressurized responsive to signals from the sensors for pushing or pulling the racks to control the oscillation of the fingers. Since the piston may reciprocate at different rates and the hydraulic delay of the cylinders is constant, the position of the target on the flywheel is adjustable to insure that the oscillation of the fingers is properly coordinated with the movement of the piston.

DESCRIPTION OF THE DRAWINGS

The foregoing will be more readily apparent upon reading the following description in conjunction with the drawings in which:

FIG. 4 is a perspective view of the improved agitating fingers and their respective drive mechanisms;

FIG. 5 depicts the flywheel of the extrusion machine showing the relationship of the target and the sensors;

FIG. 6 is a combined electrical and hydraulic schematic diagram of an exemplary control system for moving the racks which drive the agitating fingers; and FIG. 7 is a fragmentary perspective view of exemplary composition board.

DESCRIPTION OF THE PREFERRED EMBODIMENT

Figure 1:
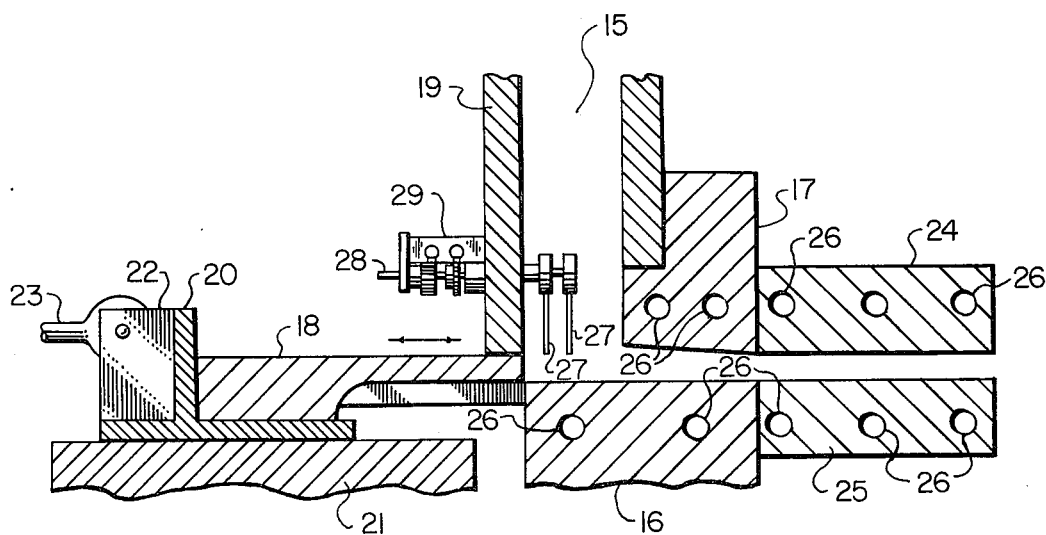
FIG. 1 is a sectional schematic view showing the improved apparatus of this invention and its relationship to the extrusion machine of the aforementioned patent.

Exemplary apparatus is depicted wherein like reference numerals indicate like parts throughout the several figures. The extrusion machine is of the type disclosed in the aforementioned U.S. Pat. No. 3,229,009, incorporated by reference herein, and only such detail as is necessary for an understanding of the operation of the present invention will be repeated herein.

Typical composition board 10 manufactured by the extrusion machine of the aforementioned patent is depicted in FIG. 7. Composition board 10 includes a generally flat panel 11 having an upper surface 12 and a lower surface 13. A plurality of spaced apart parallel bars, or ribs, 14 depend integrally from the lower surface 13 of the panel 11 and have a thickness substantially equal to the panel 11. The ribs 14 extend perpendicularly outwardly from the panel 11. Board 10 is formed by an extrusion process from lingo-cellulose particles combined with a suitable resin binder, the mixture being forced through a heated mold section and a curing cooker as described in the aforementioned patent.

To form the board 10, a mixture of ligno-cellulose particles and resin binder is metered from a hopper (not shown) into a feed chamber 15. The lower end of the feed chamber 15 is terminated in a lower mold 16. Lower mold 16 in cooperation with upper mold 17 forms a cavity of cross-sectional shape which is complementary to the shape of the board 10. Thus, the lower surface of upper mold 17 is planar and the upper surface of lower mold 16 is channeled. A piston 18 which has a cross-section shape identical to that of board 10 is reciprocated through the lower end of feed chamber 15 and pushes the constituent materials through the mold. The travel distance of piston 18 is approximately 2½ inches and the length of the feed chamber is approximately 1⅝ inches. When piston 18 is in the fully retracted position, as shown in FIG. 1, its front face is aligned with rear wall 19 of feed chamber 15. When piston 18 is in its fully extended position, it extends approximately ⅞ inch into the mold cavity. Piston 18 rides on slide block 20 which in turn rides on slide bearing 21. Slide block 20 includes a plurality of ears 22 each connected to a link 23. As shown in the aforementioned patent, link 23 is connected through a link mechanism eccentically to a rotating shaft. This link mechanism and the rotation of the shaft causes slide block 20 to move back and forth in the horizontal plane, reciprocating piston 18 as shown by the arrows. The shaft to which the link mechanism is connected is connected to a drive pulley at one end and a flywheel at the other end. The flywheel rotates completely for every full reciprocation of piston 18. The relevance of this relationship will become apparent from the discussion and description that follows. Returning now to FIG. 1, the mixture of constituent material which is forced by piston 18 through the mold cavity formed by lower mold 16 and upper mold 17 then passes through a cavity formed by upper cooker 24 and lower cooker 25, the cross-sectional shape of which is similar to that of the mold section. A plurality of heating elements 26 extend through the mold and cooker elements to maintain these elements at elevated temperatures for forming and curing the board. It should be noted at this point that FIG. 1 is not to scale, as in accordance with an operative machine the width of the mold is approximately 9 inches and the width of the cooker is approximately 4 feet.

Internal to feed chamber 15 are a plurality of agitation fingers denoted generally as 27. Fingers 27 are arranged in pairs, a pair of fingers being above each of the channels in lower mold 16. The pair of fingers 27 are journaled for rotation about shaft 28 by means of an oscillation mechanism which will be described infra. At this point it suffices to say that fingers 27 are caused to oscillate approximately 30 degrees in either direction from the vertical, with the oscillation of the fingers in each pair being opposite to one another. This oscillation is controlled by mechanism 29 and is coordinated with the reciprocation of piston 18.

Figure 2:
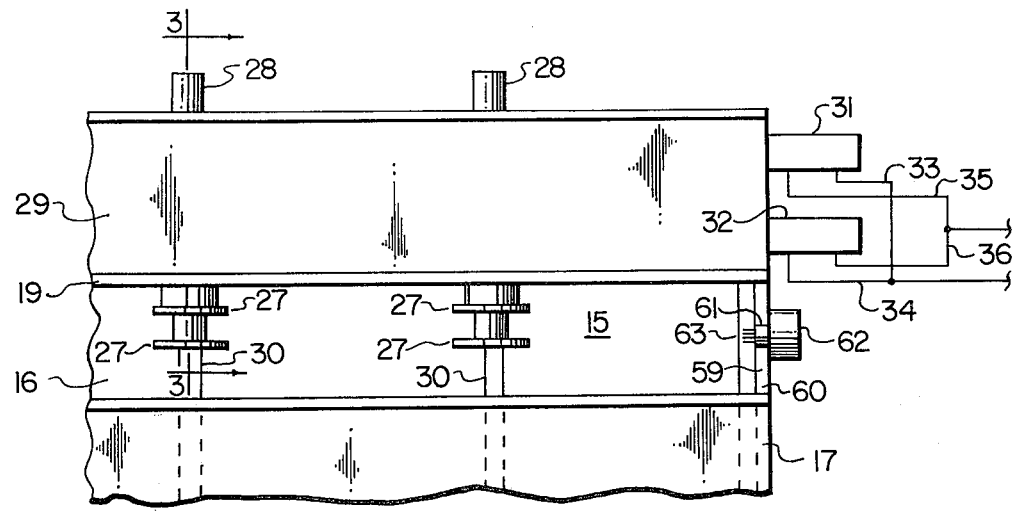
FIG. 2 is a fragmentary plan view showing the placement of the improved apparatus of this invention in the feed chamber of the extrusion machine.

FIG. 2 depicts a plan view of feed chamber 15 showing the placement of the agitating fingers 27 therein. Mechanism 29 is mounted on the rear wall 19 of chamber 15. A plurality of shafts 28 extend through mechanism 29 and wall 19 and mounted on shafts 28 within feed chamber 15 are the agitating fingers 27. Agitating fingers 27 are arranged in pairs, each pair being above a respective channel 30 of lower mold 16. Mounted at an extreme end of mechanism 29 are a pair of hydraulic cylinders 31 and 32. These cylinders 31 and 32 are of the double acting type, the internal pistons therein being adapted to move either toward the right or the left depending upon which end of the cyliner is supplied with pressurized hydraulic fluid. As shown in FIG. 2, each of the cylinders 31 and 32 has two hydraulic lines. The right line 33 of cylinder 31 is connected to the left line 34 of cylinder 32 and the left line 35 of cylinder 31 is connected to the right line 36 of cylinder 32. Each of the cylinders 31 and 32 has an internal piston therein connected to a respective rod which extends into mechanism 29. It is apparent from the connection of the cylinder pressure lines that when the rod and piston of cylinder 31 moves toward the left that the rod and piston of cylinder 32 will move toward the right, and vice versa. Connected to these rods are respective rack gears internal to mechanism 29. The fingers 27 are connected to respective pinion gears internal to mechanism 29, the pinion gears of the forward fingers engaging one rack and the pinion gears of the rearward fingers engaging the other rack. Since the racks move in opposite directions with respect to one another, it is apparent that the forward and rearward fingers will rotate oppositely. That is, all of the forward fingers will rotate in a clockwise direction when all of the rearward fingers rotate in a counterclockwise direction, and vice versa. The pressurizing of cylinders 31 and 32 is controlled in accordance with the position of the flywheel of the extrusion machine, in a manner to be described hereinafter.

Figure 3:
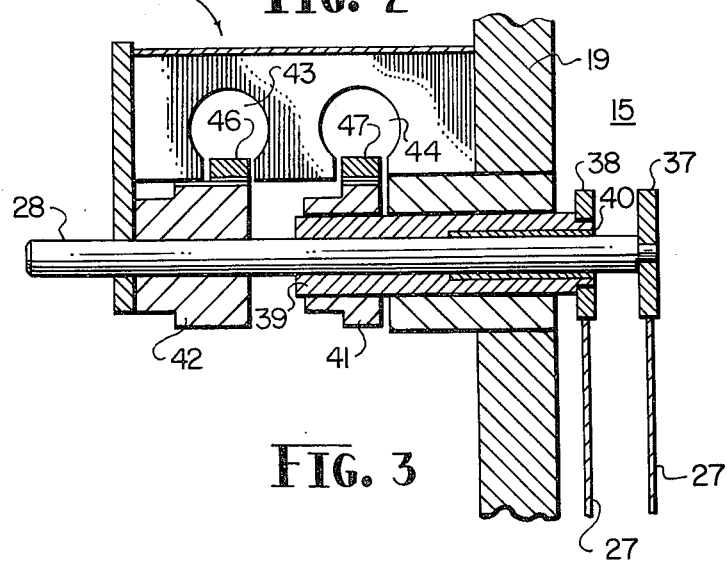
FIG. 3 is a fragmentary sectional view taken along the line 3—3 of FIG. 2.

Referring now to FIGS. 3 and 4, the drive mechanism for the agitating fingers will now be described. The forward one of the fingers 27 is mounted on disc member 37 and the rearward one of the fingers 27 is mounted on disc member 38. Disc member 37 is press-fitted onto shaft 28 and disc member 38 is press-fitted onto cylindrical member 39. Cylindrical member 39 is pressfitted onto bushing 40 and is adapted to rotate freely about shaft 28. Connected to cylinder 39 is pinion gear 41 and connected to shaft 28 is pinion gear 42. Two openings 43 and 44 extend laterally through block 45 which is mounted on wall 19 of feed chamber 15. Inside opening 43 is rack gear 46 and inside opening 44 is rack gear 47. These rack gears are adapted to move freely within the respective openings. Rack gear 46 is connected to the rod of pneumatic cylinder 31 and rack gear 47 is connected to the rod of hydraulic cylinder 32. Rack gear 46 engages pinion gear 42 and rack gear 47 engages pinion gear 41. Pinion gear 42 is wider than rack 46 to allow the position of the forward agitating fingers to be adjusted relative to wall 19. It has been found that this position affects the density of the composition board.

FIG. 5 depicts a flywheel 48, the position of which is utilized to control the timing of the oscillation of the fingers 27. Flywheel 48 corresponds to the flywheel designated 40 in the aforementioned U.S. Patent. Attached to the rim of flywheel 48 is a target 49 which comprises a metal plate having slots therein. These slots are adapted to accept bolts 50 and 51 which are threaded into the rim of flywheel 48. The slots allow target 49 to be moved relative to flywheel 48 to compensate for the inherent delay of the hydraulic system as the speed of the extrusion machine is varied. Fixedly mounted on the extrusion machine and diametrically opposed with respect to flywheel 48 are sensors 52 and 53 which are illustratively of the type known as Autotron Model A930 proximity timing controls manufactured by Autotron, Inc. of Danville, Illinois. These sensors have coils therein and inductively sense the presence of target 49 thereunder. One of the sensors corresponds to piston 18 being in the fully retracted position to cause the fingers 27 to oscillate in a first direction and the other sensor corresponds to piston 18 being in a fully extended position to cause fingers 27 to oscillate in the second direction. In the schematic diagram of FIG. 6, sensors 52 and 53 are illustratively depicted as switches for closing energization circuits for respective solenoids 54 and 55. Solenoids 54 and 55 are connected to opposite ends of a spool valve 56 which is illustratively of the type known as Model QM-005-0-10Bl manufactured by the AA Company of Manchester, Michigan. Spool valve 56 is connected in a hydraulic circuit which includes a reservoir of hydraulic fluid 57 and a pump 58. With the spool valve in the position shown in FIG. 6, pump 58 supplies hydraulic fluid under pressure to cylinders 31 and 32 so as to pull rack 46 towards cylinder 31 and to push rack 47 away from cylinder 32. When target 49 passes under sensor 53, solenoid 55 is energized, pulling the spool within spool valve 56 toward the right. In this position, the pressurization path for pump 58 is reversed with respect to cylinders 31 and 32 and rack 46 is pushed away from cylinder 31 while rack 47 is pulled towards cylinder 32. It is thus seen that with racks 46 and 47 engaging their respective pinion gears 41 and 42, the forward and rearward fingers oscillate in opposite directions. The hydraulic system of FIG. 6 has inherent delay such that the elapsed time from sensing target 49 by one of the sensors 52 or 53 to the time that the fingers oscillate is constant while the speed of the piston 18 may vary. Therefore, the target 49 must be adjusted so that the hydraulic system operation will either lag or lead the piston movement to compensate for the piston speed. It is readily apparent that the target 49 and sensors 52 and 53 may be replaced by a shaft encoder whereby the hydraulic system timing may be electronically changed as a function of piston speed rather than by mechanically adjusting the position of target 49.

To provide agitation to the composition board constituent material which drops into feed chamber 15 over a channel 59 directly adjacent the end wall 60 of feed chamber 15, there is provided a wheel 61 adapted to rotate within a corresponding opening in wall 60. Wheel 61 is spun by hydraulic motor 62, mounted on wall 60. Extending outward from wheel 61 into feed chamber 15 are a plurality, illustratively four, of pins 63 which agitate the constituent material to maintain the proper density of the manufactured board in the rib corresponding to channel 59.

It is desirable that the legs 14 and planar area 11 of the product be of uniform density. It has been discovered that density of the legs can be controlled by controlling the time at which oscillation of the fingers is initiated relative to initiation of movement of the piston. The legs can be made denser by initiating oscillation of the fingers earlier relative to movement of the piston. Conversely, a less dense leg is produced if initiation of oscillation is delayed. As indicated previously, the time at which oscillation should be initiated in order to maintain a constancy will vary as the rate at which the plunger is reciprocated varies. For higher rates of reciprocation of the plunger, oscillation of the fingers should be initiated earlier, and, conversely, oscillation of the fingers should be initiated later if the rate of reciprocation of the plunger is descreased.

Numerous other variations or modifications and adaptations of the present invention will be apparent to those skilled in the art. For example, other means, such as a shaft encoder can be used for providing signals indicative of the position of the plunger, and such as come within the spirit and scope of the appended claims are considered to be embraced by the present invention.

What is claimed is:

1. In apparatus for extruding composition board from a mixture of lignocellulose fines and resins, wherein said board is comprised of a flat portion and a plurality of ribs extending outwardly therefrom and said apparatus includes an upper mold structure having an upper mold surface for forming a planar surface on said board;

a lower mold structure having a lower mold surface including a plurality of parallel channels for forming a ribbed surface on said board, said lower mold structure being spaced from said upper mold structure to form a mold cavity having an inlet opening and an outlet opening, said lower mold structure extending beyond said inlet opening;

structure forming a feed chamber for said mixture leading to said inlet opening, the portion of said lower mold structure which extends beyond said inlet opening forming a channelled floor for said feed chamber;

means including a reciprocating piston structure mating with said inlet opening for moving said mixture through said mold cavity to said outlet opening;

improved means for agitating said mixture in said feed chamber above said channels in said lower mold structure comprising:

a plurality of first finger members each positioned above a respective channel;

a plurality of second finger members each associated with and spaced from a respective one of said first finger members;

first rotating means for rotating said first finger members each about an axis parallel to the respective channel;

second rotating means for rotating said plurality of second finger members each about said respective axis, the associated first and second finger members being rotatable independent of each other;

means for sensing the position of said reciprocating piston structure and generating a first signal indicative of said reciprocating piston structure being at a first position at or near one end of the travel and generating a second signal indicative of said reciprocating piston structure being at a second position at or near the other end of the travel; and control means responsive to said first signal for actuating said first rotating means to rotate said plurality of first finger members in a first direction and for actuating said second rotating means to rotate said plurality of second finger members in a second direction and responsive to said second signal for actuating said first rotating means to rotate said plurality of first finger members in said second direction and for actuating said second rotating means to rotate said plurality of second finger members in said first direction.

2. The improved agitating means according to claim 1 wherein said first rotating means includes a plurality of first pinion gears each coupled to a respective one of said plurality of first finger members, a first rack gear engaging all of said plurality of first pinion gears, and first double acting hydraulic cylinder means including a first piston coupled to said first rack gear, and said second rotating means includes a plurality of second pinion gears each coupled to a respective one of said plurality of second finger members, a second rack gear engaging all of said plurality of second pinion gears, and second double acting hydraulic cylinder means including a second piston coupled to said second rack gear.

3. The improved agitating means according to claim 2 wherein said control means includes hydraulic fluid means responsive to said first signal for supplying hydraulic fluid under pressure to said first and second cylinder means so as to cause said first piston to move said first rack gear in a first direction and to cause said second piston to move said second rack gear in a second direction opposite to said first direction, and responsive to said second signal for supplying hydraulic fluid under pressure to said first and second cylinder means so as to cause said first piston to move said first rack gear in said second direction and to cause said second piston to move said second rack gear in said first direction.

4. The improved agitating means according to claim 3 wherein said hydraulic fluid means includes:
spool valve means having a first pair of ports, a second pair of ports, and path means selectively controllable to connect said first port pair to said second port pair so as to condition said spool valve means for a first or second direction of flow therethrough;
a reservoir of hydraulic fluid and a hydraulic pump connected to said first port pair;
means connecting said first and second cylinder means to said second port pair;
means responsive to said first signal for controlling said path means so as to condition said spool valve means for said first flow direction; and
means responsive to said second signal for controlling said path means so as to condition said spool valve means for said second flow direction.

5. The improved agitating means according to claim 1 wherein said sensing means is adjustable to vary the relative timing of said first and second signals with respect to the ends of travel of said reciprocating piston structure.

* * * * *